(12) United States Patent
Astley et al.

(10) Patent No.: US 7,560,031 B1
(45) Date of Patent: Jul. 14, 2009

(54) PROCESS FOR TREATING POND WATER

(75) Inventors: Vaughn V. Astley, Highland City, FL (US); Dennis H. Michalski, Highland City, FL (US)

(73) Assignee: Dr. Phosphate, Inc., Highland City, FL (US)

( * ) Notice: Subject to any disclaimer, the term of this patent is extended or adjusted under 35 U.S.C. 154(b) by 0 days.

(21) Appl. No.: 11/736,143

(22) Filed: Apr. 17, 2007

Related U.S. Application Data

(63) Continuation of application No. 11/610,846, filed on Dec. 14, 2006, now abandoned.

(60) Provisional application No. 60/597,630, filed on Dec. 14, 2005.

(51) Int. Cl.
*C02F 1/56* (2006.01)

(52) U.S. Cl. .................. 210/710; 210/713; 210/718; 210/725; 210/727; 210/906; 210/915; 423/321.1

(58) Field of Classification Search .............. 210/906, 210/724
See application file for complete search history.

(56) References Cited

U.S. PATENT DOCUMENTS

| | | | |
|---|---|---|---|
| 2,799,557 A * | 7/1957 | Seyfried et al. ............. 423/160 |
| 3,551,332 A | 12/1970 | Baumann et al. |
| 3,625,648 A | 12/1971 | Randolph |
| 3,725,265 A * | 4/1973 | Legal .................... 210/710 |
| 4,171,342 A | 10/1979 | Hirko et al. |
| 4,320,012 A * | 3/1982 | Palm et al. .................. 210/713 |
| 4,374,810 A * | 2/1983 | O'Neill .................... 423/160 |
| 4,612,173 A | 9/1986 | Gosch et al. |
| 4,657,680 A * | 4/1987 | Zibrida .................... 210/713 |
| 4,698,163 A | 10/1987 | Zibrida |
| 5,002,744 A | 3/1991 | Gliksman et al. |
| 5,066,471 A | 11/1991 | Michalski |
| 5,112,499 A | 5/1992 | Murray et al. |
| 5,171,452 A | 12/1992 | Palm et al. |
| 5,312,610 A | 5/1994 | Hutter |
| 5,316,748 A | 5/1994 | Palm et al. |

(Continued)

OTHER PUBLICATIONS

Francis T. Neilsson, Manual of Fertilizer Processing, 1987, pp. 480-482, Marcel Dekker, Inc., New York.

*Primary Examiner*—Peter A Hruskoci
(74) *Attorney, Agent, or Firm*—Robert J. Varkonyi; Smith & Hopen, P.A.

(57) ABSTRACT

A process for the treatment of phosphoric acid plant pond water facilitating the recovery of phosphorus values from the input pond water. In certain aspects the process recycles solids from a later stage neutralization and separation into the clarified liquid stream from an initial clarification and neutralization stage. A sufficient amount of solids are added to the clarified liquid stream to effect the pH-dependent precipitation of a phosphate product. In alternative aspects an intermediate pH-dependent precipitation of a phosphate product is achieved through the addition of a neutralizing agent. The phosphate product is further characterized by a low concentration of fluoride. In addition the phosphate product can be further processed to a high purity technical grade phosphoric acid. In certain aspects the process employs flocculating agents to enhance the formation of precipitates. In further aspects, methodologies taught herein facilitate the reduction of silica in the process streams. Processes according to the present invention are further characterized by an enhanced recovery of treated water, reduced sludge impoundment and reduced lime consumption when compared to conventional double liming processes.

35 Claims, 9 Drawing Sheets

U.S. PATENT DOCUMENTS

| | | |
|---|---|---|
| 5,366,640 A | 11/1994 | Palm et al. |
| 5,458,768 A | 10/1995 | Andersen |
| 5,609,123 A | 3/1997 | Luke et al. |
| 5,688,404 A | 11/1997 | Luke et al. |
| 6,077,441 A | 6/2000 | Luke |
| 6,213,416 B1 | 4/2001 | Luke |
| 6,235,257 B1 | 5/2001 | Palm et al. |
| 6,758,976 B2 | 7/2004 | Michalski et al. |
| 6,758,977 B2 * | 7/2004 | Michalski et al. ............ 210/696 |
| 7,022,242 B2 | 4/2006 | Sacchi |

* cited by examiner

PROCESS FOR TREATING POND WATER

CROSS REFERENCE TO RELATED APPLICATIONS

This application is a continuation of U.S. Nonprovisional patent application Ser. No. 11/610,846, entitled, "Process for Treating Pond Water," filed Dec. 14, 2006, now abandoned which claims priority to U.S. Provisional Patent Application 60/597,630, entitled, "Treatment of Phosphoric Acid Plant Pond Water", filed Dec. 14, 2005, the contents of which are herein incorporated by reference.

FIELD OF INVENTION

This invention relates to a method of treating pond water resulting from the operation of wet process phosphoric acid plants. More specifically, this invention relates to a process for treating pond water to decrease lime usage, release more water, decrease impound areas, and recover phosphate as a valuable product.

BACKGROUND OF THE INVENTION

Production of phosphoric acid by what is commonly known as the "wet process" involves the reaction of finely ground phosphate rock with sulfuric acid. As a result of the various reactions, a slurry is produced containing phosphoric acid, calcium sulfate and various impurities derived from the phosphate rock. This slurry is normally filtered to separate the phosphoric acid product from the byproduct calcium sulfate. The phosphoric acid thus obtained is then used in the production of various phosphate fertilizers such as, ammoniacal fertilizers via neutralization of the acid with ammonia.

Several varieties of this process are utilized around the World, but the most commonly employed is the Di-Hydrate process in which a specific crystalline form of calcium sulfate is produced by reaction of the calcium present in the raw phosphate ore, and the sulfuric acid used to acidulate the ore. Approximately 5 tons of calcium sulfate or gypsum are formed per ton of phosphate ($P_2O_5$) produced.

Water is normally used to wash the calcium sulfate filter cake and thereby increase the recovery of the phosphoric acid product. Most of this wash water is fed back into the phosphoric acid production process as make-up water. However, a portion of this water together with some residual phosphoric acid remains trapped in the calcium sulfate filter cake and is discharged from the filter with the filter cake. This trapped water contains several percent of phosphoric acid and small amounts of other impurities that were present in the raw material used to produce the phosphoric acid product. Additional water is normally used to help discharge the calcium sulfate filter cake off of the filter and then large volumes are used to transport it, by pumping as a slurry to a storage or disposal area. Thus, the discharge, or "pond water" as it is generally referred to, is created. The pond water generated in the process is of substantial volume and its storage and disposal are significant factors in the operation of a phosphoric acid plant. Measures to effectively address the by-products produced as embodied in the pond water are of great economic and environmental importance to the operators of the plant and the public.

At the storage or disposal area the calcium sulfate will settle and the excess transportation water will be liberated. This liberated water will normally be collected in a system of channels and ponds and recycled to the phosphoric acid production plant for reuse. The pond water is used for washing the calcium sulfate filter cake, for cooling and scrubbing process vapors, and can be used in grinding the rock to produce a slurry, and other purposes that do not require fresh water. These channels and ponds also serve as a collection site for other water that is used in and around the phosphoric acid plant, such as for cleaning or washing, fresh water fume scrubbers, and as a collection site for phosphoric acid spills or leaks within the plant. Also, since these channels and ponds are located outside, they collect rain water.

Since all of the water contained within these channels and ponds contains small amounts of phosphoric acid and other impurities normally present in the phosphoric acid, it is considered contaminated. Most particularly, the recycled or process water contains about 0.25% to 3% phosphoric acid, similar amounts of fluoride species, several hundred milligrams per liter of soluble ammonia, and trace amounts of many heavy and toxic metals. As such it is really not water in the traditional sense, but rather a weak but very acidic solution. The phosphoric acid plant pond water, or simply "pond water", is also known as cooling pond water, gyp stack water, gypsum pond water, and wastewater. Pond water has many sources in a phosphate complex, barometric condenser water, scrubber water, and gypsum stack water. These streams report to a large open containment area referred to as the pond. A pond can cover many tens to hundreds of acres, and contain billions of gallons of acidic pond water. The accumulated water must be treated or purified to remove phosphoric acid and other impurities prior to being released to the environment. In some cases, in an efficiently operated phosphoric acid plant, in the absence of severe weather conditions, a balance will exist between water input to the pond system and water evaporation such that virtually all of this contaminated water can be recycled and used within the plant. In this case, treatment and discharge of the contaminated water, commonly known as pond water, is not necessary.

However, there are circumstances under which treatment and discharge of the contaminated pond water is necessary. One such circumstance could be an extended period of abnormally heavy rainfall. When the climatic cycle is such that rainfall and evaporation do not match, and one significantly outweighs the other, such as in the case of significant storm events or a drought, the process water balance is severely impacted. Of greatest consequence is the situation where several storms cause the collection and mixing of large quantities of storm water with the process water, raising of the water inventories to unsafe levels risking breach of the pond containment. Environmental damage can occur if the process water is abruptly discharged into local streams and rivers. Thus, it is necessary to routinely reduce excessive contaminated water (pond water) inventories to prevent its accidental discharge and the attendant environmental impact. Another scenario where it is necessary to address pond water inventory disposal would be when the phosphoric acid plant has ceased operation either for an extended period of time or permanently.

Many factors influence the specific components and their concentrations in this contaminated pond water. While it cannot be said that there is any typical composition for pond water some of the major chemical components that could be found in pond water, and an example of their range of concentrations, are as follows:

| CHEMICAL COMPONENT | RANGE OF CONCENTRATION |
|---|---|
| P | 1000-12,000 ppm |
| $SO_4$ | 4300-9600 ppm |
| F | 50-15,000 ppm |
| Si | 30-4100 ppm |
| (ammoniacal) N | 40-1500 ppm |
| Na | 1200-2500 ppm |
| Mg | 160-510 ppm |
| Ca | 450-3500 ppm |
| K | 80-370 ppm |
| Fe | 5-350 ppm |
| Al | 10-430 ppm |
| Cl | 10-300 ppm |

Normally the major acidic components of pond water are phosphoric acid and sulfuric acid, with lesser amounts of hydrofluorosilicic acid ($H_2SiF_6$), and hydrofluoric acid (HF). The pond water is normally saturated or supersaturated with respect to many of its constituent ions, the only exception being after a period of heavy rainfall. Also, since the pond water is used for cooling it is continuously subjected to thermal cycling (heating and cooling). This thermal cycling, along with the addition of some waste fresh water to the pond water, is why the pond water can function as an effective scrubbing fluid for some process gasses.

The process of "double liming" has been the industry standard for treating or purifying pond water. A general schematic of the process as is known in the art is shown in FIG. 1. This method consists of adding a calcium compound (such as $CaCO_3$, $Ca(OH)_2$ or CaO) to the pond water, in two stages, such that the fluoride, phosphate and other impurities form solid precipitates that settle and are separated from the thus purified water. This method is described in Francis T. Nielsson, ed., Manual of Fertilizer Processing, Marcel Dekker, Inc. (1987), pp. 480 to 482; G. A. Mooney, et al., Removal of Fluoride and Phosphorus from Phosphoric Acid Wastes with Two Stage Line Treatment, Proceedings of the 33rd Industrial Waste Conference, Purdue Univ. (1978); G. A. Mooney et al., Laboratory and Pilot Treatment of Phosphoric Acid Wastewaters, presented at the Joint Meeting of Central Florida and Peninsular, Florida A.I.Ch.E. (1977); and U.S. Pat. Nos. 5,112,499; 4,698,163; 4,320,012; 4,171,342; 3,725,265 and 3,551,332.

FIG. 2 is a more detailed illustration of the conventional double liming process as shown in FIG. 1. During the first neutralization stage lime treatment 20a, lime 12 is added to pond water 10 to raise the pH of the solution to about 4 to 5, resulting in the precipitation of fluoride as $CaF_2$ and/or $CaSiF_6$. During this stage it is also thought that some of the hydrofluorosilicic acid present dissociates to HF and $SiF_4$, with the $SiF_4$ hydrolyzing to HF and $SiO_2$. Some phosphate is also precipitated at this stage, as well as some calcium sulphate. The limed water, stream B, is then clarified 20b, being separated into a clarified overflow stream, stream D, and an underflow, stream E, containing the precipitated solids. The sludge produced at this stage is a granular, crystalline material that settles fairly rapidly and can be de-watered to about 30% solids in a gravity thickener. The sludge, stream E, can be sent to disposal 30 at the plant gypsum stack or recycled to the phosphoric acid plant for recovery of the phosphate.

In the final neutralization stage 60a, additional lime, is added to the clarified liquid from the first neutralization stage 20, stream D, to obtain a pH of about 8-10. In the final neutralization stage 60a, the remaining phosphates and fluorides are precipitated along with sulfate and many of the metals. The sludge in this stage has poor settling and thickening properties, due to the hydroxide nature of many of the compounds, and rarely achieves more than 5%-7% solids by weight. The sludge, stream H, from this final neutralization stage 60b is normally deposited 30b in large lagoons to allow for additional de-watering. In typical double liming, some of the final neutralization stage underflow, stream H, would be sent back to the pond water reservoir 10 or be added to the first stage 20a. However, without sufficient agitation, the bulk of the lime, coated with the reacted solids formed in the final stage 60a, would sit on the bottom of the pond. If too high, a proportion is added to the first stage, the system may become disrupted, due to the poor settling characteristics of these solids. For these reasons, most of the conventional double liming final stage underflow solids are impounded in their own pond 30b and the phosphate values lost.

If in this treatment, the final neutralization stage 60 clarified water, stream G, contains unacceptable levels of soluble ammonia, the final neutralization stage system 60a can be operated at a higher pH, from pH 10 to 12, to increase the un-ionized ammonia concentration, raising its volatility. The increased vapor pressure of the ammonia in solution facilitates its removal through air stripping 80 by the addition of spray devices located in or floating on the sedimentation lagoon. Even without the addition of a spray system 80, operation of the treatment lagoon at a pH of 9 to 10 or greater results in the removal of ammonia through volatilization due to the large surface area available for such activity.

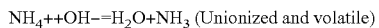
$NH_4^+ + OH^- = H_2O + NH_3$ (Unionized and volatile)

The water stream G is treated with acid 80 to produce dischargeable water, stream I, that is discharged from the process 90.

The quantity of clear water that can be obtained from a double liming process is about 50%-70% of the feed volume. As an alternative, liming procedures can be carried out in a single stage.

However, there are several problems associated with this method. One problem is the large volume of sludge produced. Sludge (i.e., a mixture of the precipitated impurities, un-reacted calcium compounds and water) is produced in both the first and final stages of this process. These sludge materials, some of which de-water slowly, are normally deposited in settling ponds that require large land areas. Another significant problem with this treatment process is that very large volumes of lime are required to neutralize the acidic pond waters, some of which can have a pH as low as one.

It would be highly desirable to have a process that utilizes less lime in the treatment of the plant pond water to reduce the lime consumed in the treatment and, accordingly, the cost of treating the pond water. It would be highly beneficial to recapture a portion of the lime used in the process for reuse in the neutralization stages, thus limiting lime input. Furthermore, it would be highly desirable to have a method of capturing residual phosphate/phosphoric acid contained in the pond water thus enhancing overall phosphate production yields for the plant while simultaneously reducing the acidity and toxicity of the pond water, ultimately enabling its discharge to the environment. This invention serves these important needs and others as will become apparent.

SUMMARY OF INVENTION

The present invention provides a process for the treatment of pond water facilitating the recovery of phosphate values from the input pond water. The process enables the recovery of phosphate values typically lost in treating pond water by more traditional methods such as double liming. The phosphate product recovered in the process has a significant value as compared to the voluminous waste typically generated in traditional treatment process. Furthermore, the phosphate product is characterized by its low fluoride values and significantly reduced contaminants such as heavy metals.

Additionally, of the present invention results in processes with increased water recovery over more traditional processes. The increased water recovery can be leveraged to facilitate the increased discharge of treated water into the environment, thus further reducing the cost associated with impounding large quantities of waste, contaminated water and other by-products of processes such as phosphoric acid production.

Additionally, because the processes taught herein employ recursive methodologies for the re-use of key ingredients, most particularly lime re-use via the recycling of products from later reaction stages back into earlier stages, systems employing the methodologies taught herein will decrease the quantities of these ingredients, thus providing a significant economic advantage to the user. Furthermore, reuse by recycling reduces the quantities of sludge that must be impounded.

According to the present invention, the foregoing and other objects and advantages are attained by a process for treatment of pond water. In accordance with an aspect of the invention the process includes a first liming stage, a product generation stage and a final liming stage. The first liming stage includes the steps of increasing the pH of the pond water to form a first liming stage precipitate and separating the first liming stage precipitate from the aqueous solution to obtain a clarified liquid. The product generation stage includes the steps of mixing the clarified liquid with solids from a final liming stage to form a product generation stage precipitate and separating the product generation stage precipitate from the aqueous solution to obtain a solid product and a re-clarified liquid. The solid product contains phosphate values from the pond water. As indicated above, this solid product is a valuable product in that it recaptures phosphate values in the pond water that typically are discarded in the treatment of pond water. The solids from the final liming stage contain lime values trapped therein which are recycled into the process by mixing with the clarified liquid. The solids thus raise the pH of the clarified liquid. Furthermore, given the recursive nature of the process, phosphate values escaping earlier product generation steps are reintroduced into the product generation step, thus facilitating their capture. By recycling the solids overall lime consumption is reduced in the process as compared to processes relying solely on the addition of lime, or similar compounds, to raise the pH of the pond water. The final liming stage includes the steps of adding lime to increase the pH of the re-clarified liquid to form a final liming stage precipitate, separating the final liming stage precipitate from the aqueous liquid to form the solids from the final liming stage and the clarified treated water and directing the clarified treated water for further use, treatment or disposal. The solids from the final liming stage are the solids added in the product generation stage.

In certain embodiments the pH is increased in the first liming stage with a base selected from the group consisting of $CaCO_3$, $Ca(OH)_2$, $CaO$, $NaOH$, $NaHCO_3$, $Na_2CO_3$, $KOH$, $KHCO_3$, $K_2CO_3$, ammonia and ammonia salts. In an advantageous embodiment the pH is increased in the first liming stage with lime. In a further advantageous embodiment the step of increasing the pH of the pond water in the first liming stage is performed by the addition of a base in a quantity sufficient to result in a pH of about 3.0 to about 5.0.

In certain embodiments the solids from the final liming stage are added in sufficient quantity to raise the pH of the clarified water in the product generation stage to the range from about 4.0 to about 7.5. In an advantageous embodiment the solids from the final liming stage are added in sufficient quantity to raise the pH of the clarified water in the product generation stage to about 6 to 7.5. The solid product from the product generation stage is suitable for inclusion as an animal feed supplement or feedstock for technical grade phosphoric acid production.

In certain embodiments the process for the treatment of pond water further includes the steps of adding a fluorosilicate precipitating compound prior to the step of increasing the pH of the pond water to form a first liming stage precipitate. The fluorosilicate precipitating compound can be water-soluble sodium compounds and water-soluble potassium compounds. The sodium or potassium compound is added to cause precipitation by reaction with fluorides in the pond water thus forming a substantially insoluble fluorosilicate salt. This furthers the removal of fluorides from the pond water and ensures the ratio of fluoride to phosphorus is acceptably low. In an advantageous embodiment method the previously described steps further include the step of separating the solids produced by the addition of the fluorosilicate precipitating compound prior to the step of increasing the pH of the pond water to form a first liming stage precipitate.

In certain embodiments the process for the treatment of pond water employs flocculating agents to enhance the sedimentation of a precipitate. Anionic or non-ionic flocculating agents can be added prior to the step of separating the first liming stage precipitate from the aqueous liquid and/or prior to the step of separating the final liming stage precipitate from the aqueous liquid.

In certain embodiments a quantity of lime is added to the re-clarified liquid to form the final liming stage precipitate in a quantity sufficient to result in a pH of about 8.0 to about 12.0. In an advantageous embodiment a quantity of lime is added to the re-clarified liquid to form the final liming stage precipitate in a quantity sufficient to result in a pH of about 8.0 to about 10.0. In still further advantageous embodiments a quantity of lime is added to the re-clarified liquid to form the final liming stage precipitate in a quantity sufficient to result in a pH of about 9.0 to about 12.0. Raising the pH to the range of about 9.0 to about 12.0 is particularly advantageous where ammonia removal is desired. Alternatively, the range of 8.0 to 10.0 will generally reduce lime consumption when compared to the range of 9.0 to 12.0.

In certain embodiments the process for the treatment of pond water further includes the steps of holding the re-clarified liquid portion from the product generation stage with sufficient agitation for a time period sufficient to allow silicic acid present in the clarified portion to decompose into a hydrated silicon dioxide sludge and separating the hydrated silicon dioxide sludge from the resulting clear liquid prior to the addition of lime to the re-clarified water in the final liming stage. This silica separation stage/step is generally performed after the product generation stage/step. This alleviates the contamination of the "product" by silica that would otherwise be recycled with the final neutralization/liming solids to the product generation step.

In certain embodiments the process for the treatment of pond water further includes the step of holding the clarified treated water to allow for vaporization of the residual ammonia in the clarified treated water. Vaporization can be aided by air-stripping.

In accordance with another aspect of the invention the process for the treatment of pond water includes a first liming stage and a product generation stage. The first liming stage includes the steps of increasing the pH of the pond water to form a first liming stage precipitate and separating the first liming stage precipitate from the aqueous solution to obtain a clarified liquid. The product generation stage includes the steps of mixing the clarified liquid with lime to create a product generation stage precipitate, separating the product generation stage precipitate from the aqueous solution to obtain a solid product and a re-clarified liquid and directing the re-clarified water for further treatment, use or disposal. Lime is added in the product generation stage in a quantity sufficient to raise the pH to the range of about 4.0 to about 7.5 In certain embodiments the process further includes the steps of adding lime to increase the pH of the re-clarified liquid to form a final liming stage precipitate, separating the final liming stage precipitate from the aqueous liquid, to form the solids from the final liming stage and the clarified treated water and directing the clarified treated water for further use or disposal.

In accordance with yet another aspect of the invention the process for the treatment of pond water includes a first liming stage, a product generation stage, a silica separation stage and a final liming stage. The first liming stage includes the steps of increasing the pH of the pond water to form a first liming stage precipitate and separating the first liming stage precipitate from the aqueous solution to obtain a clarified liquid. The product generation stage includes the steps of mixing the clarified liquid with solids from a final liming stage to form a product generation stage precipitate and separating the product generation stage precipitate from the aqueous solution to obtain a solid product and a re-clarified liquid. The silica separation stage includes the steps of holding the re-clarified liquid portion from the product generation stage for a time period sufficient to allow silicic acid present in the clarified portion to decompose into a hydrated silicon dioxide sludge and separating the hydrated silicon dioxide sludge from the resulting clear liquid. The final liming stage includes the steps of adding lime to increase the pH of the re-clarified liquid to form a final liming stage precipitate, separating the final liming stage precipitate from the aqueous liquid to form the solids from the final liming stage and the clarified treated water and directing the clarified treated water for further use, treatment or disposal. In certain embodiments the process further includes the step of adding a cat-ionic flocculating agent prior to the step of separating the hydrated silicon dioxide sludge from the aqueous liquid.

BRIEF DESCRIPTION OF THE DRAWINGS

For a fuller understanding of the invention, reference should be made to the following detailed description, taken in connection with the accompanying drawings, in which:

FIG. 3 illustrates the scenario where the underflow stream containing the sludge from the final stage separation and neutralization is cycled back into the product generation step, thus facilitating reuse of lime and additional recovery of residual phosphate not previously captured. The embodiment depicted in FIG. 3 generates a phosphate product suitable for use in animal feeds and the like.

FIG. 5, like FIG. 4, illustrates the scenario where the underflow stream containing the sludge from the final stage separation and neutralization is cycled back into the product generation step, thus facilitating reuse of lime and additional recovery of residual phosphate not previously captured. FIG. 5 differs from FIG. 4 by the addition of a flocculating agent for use in both the first and final stage separation steps. The embodiment depicted in FIG. 5 generates a phosphate product suitable for use in animal feeds and the like.

FIG. 6, like FIGS. 4 and 5, illustrates the scenario where the underflow stream containing the sludge from the final stage separation and neutralization is cycled back into the product generation step, thus facilitating reuse of lime and additional recovery of residual phosphate not previously captured. FIG. 6 adds the steps of silica ageing and separation to the overflow product of the product generation step, thus significantly reducing the quantity of silica-containing species going in to the final stage neutralization. The process depicted is also characterized by the addition of sodium and potassium to the pond water in preparation for the first stage.

FIG. 7 further shows the addition of a flocculating agent prior to the first and final stage separation and the silica ageing and separation.

FIG. 9 further shows the addition of a flocculating agent prior to the first and final stage separation, the addition of sulphuric acid to raise the pH of the stream prior to discharge and the addition of sodium and potassium to the pond water in preparation for the first stage neutralization.

DETAILED DESCRIPTION OF THE PREFERRED EMBODIMENT

Figure 1:
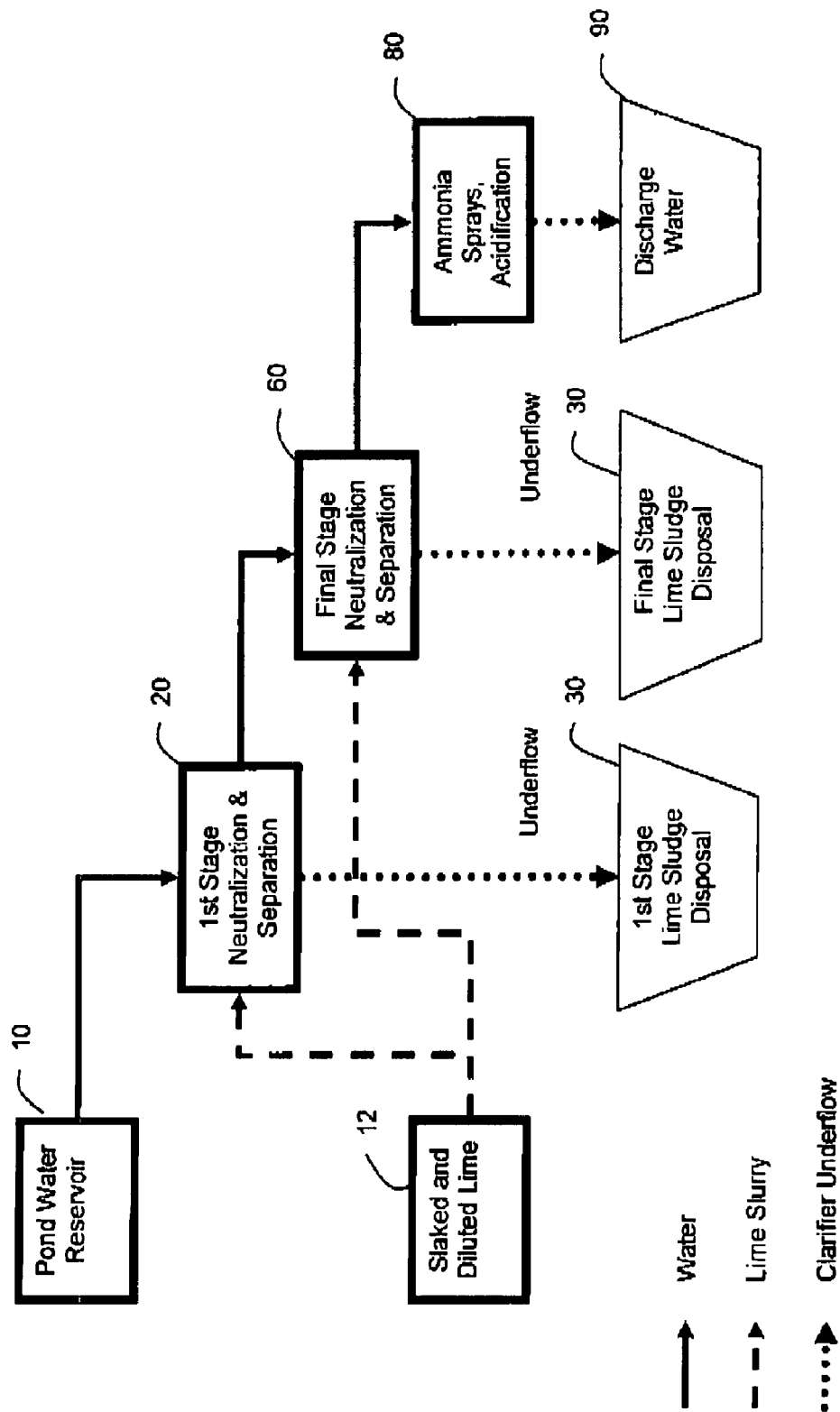
FIG. 1 is a flowchart illustrating a double liming process as currently known in the art.

The present invention is directed to a process of treating acidic waste water, or "pond water", from wet process phosphoric acid production facilities. Processes in accordance with embodiments of the invention generate a salable phosphate product by reclaiming phosphate contained in the pond water. Following a first stage neutralization and separation of precipitates, or "sludge", the resulting clarified liquid will be mixed with the precipitates from the final stage neutralization and separation. It is found that a precipitate product will form from this "product generation step." Importantly, this precipitate is found to be high in phosphate and of suitable characteristics for use in animal feeds and other similar end products requiring an input of phosphoric acid. This step also serves to reduce the phosphate content of the stream of pond water, thus facilitating its ultimate discharge. Additionally, processes in accordance with embodiments of the invention reduce the consumption of lime or other neutralizing base in comparison to traditional double liming practices. By recycling all or part of the sludge from the final stage neutralization and separation into the product generation step, the pH of the clarified stream from the first neutralization and separation step is increased, requiring a lower input of lime or other neutralizing base into the final step to achieve the necessary pH for and final stage neutralization. The recycling of sludge from the final stage has the added value of recapturing phosphate quantities that have escaped the product generation step via the recursive input of sludge.

Processes according to the present invention can be tailored to meet certain objectives based upon the inputs, the limitations of a given facility and the desired outputs, including the composition and properties of that output. For instance, if is not practicable to recycle the final stage sludge to the "Product Generation Step", the clarified first neutralization stage water can be limed to a pH of about 6, instead of recycling the final stage sludge. However, a lower product yield will be obtained and the overall lime consumption to achieve a dischargeable water will be higher.

In certain instances the phosphoric acid plant pond water contains elevated levels of fluoride and fluorosilicates. Where this is an issue, the initial pond water can be pre-treated with compounds of sodium or potassium to precipitate these fluorosilicates. Any residual silica may be allowed to hydrolyze in an ageing step, and then separated. This "Silica Separation Step" is generally performed after the product generation step. This alleviates the contamination of the "product" by silica that would otherwise be recycled with the final neutralization solids to the product generation step.

The resultant clarified water from the final neutralization stage can be further treated in manner so as to render it suitable for discharge such as ammonia remediation by spray evaporation, and acidification to a pH of about 6.5 to 8 prior to disposal.

It is an object of this invention to recover phosphate values from treatment of phosphoric plant pond water, increase the amount of releasable water, and minimize lime usage. The phosphate recovered in the "Product Generation Step" can be used as animal feed supplements. The product is a mixture of mono and di-calcium phosphate. It has about 18% phosphorus expressed as P and a low fluoride content such that P/F ratio is greater than 100:1. The product has a large market and sells between $220 and $300 per ton in 2006 dollars. In addition, because of the greater settling characteristics and compaction on settling, when compared with the conventional final neutralization stage solids, over 75% of the total incoming pond water can be discharged as opposed to 60 to 70% by the conventional double liming process. Also since the final stage sludge solids are used in generating the product, there is no need for a sludge impoundment area as is the case with the conventional double liming method. In addition, because the final neutralization stage solids are recycled, more of the un-reacted lime reacts which reduces overall lime consumption, and thus lowers the expenditure on lime. The invention is described below in examples which are intended to further describe the invention without limitation to its scope.

Figure 3:
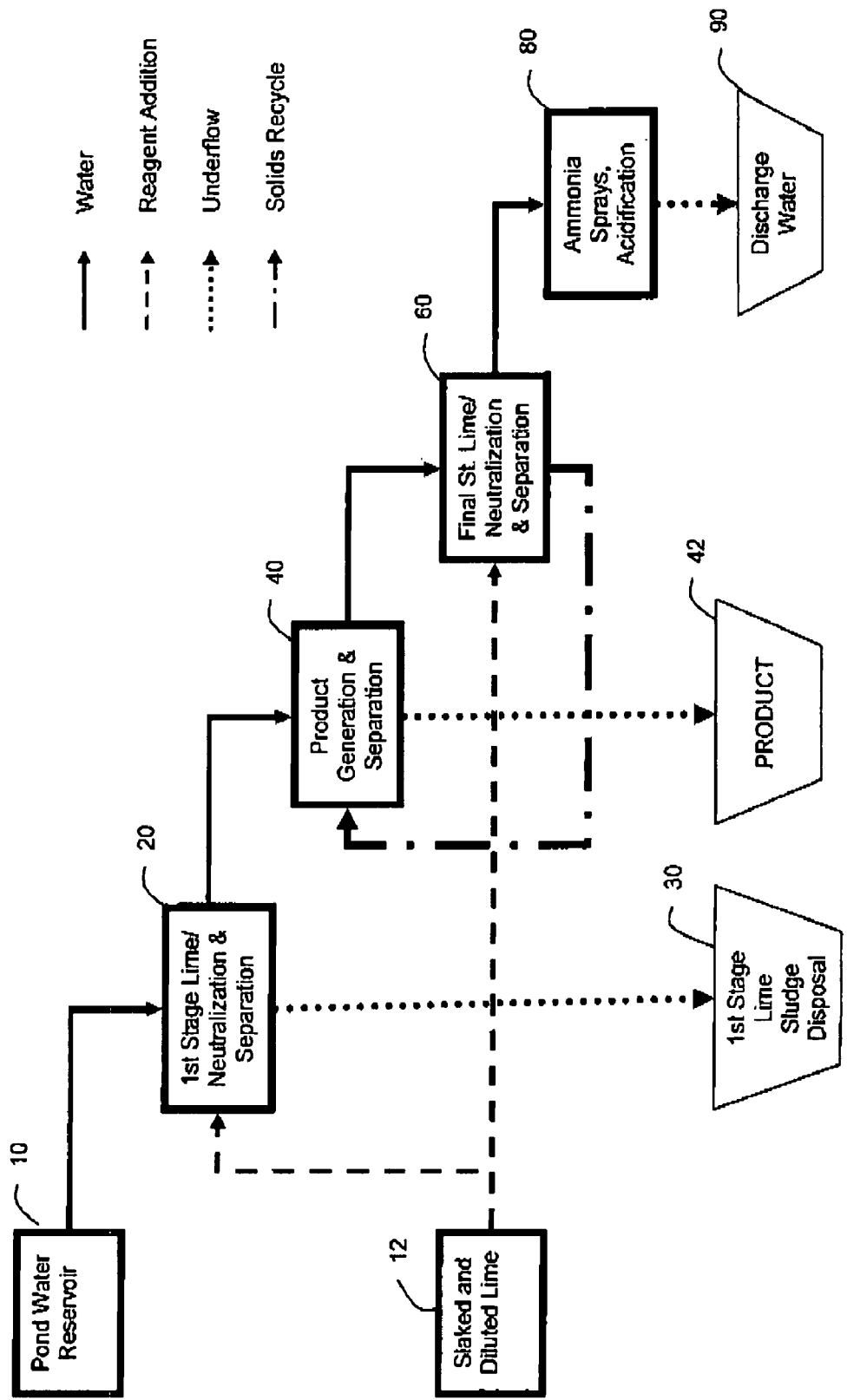
FIG. 3 is a flowchart illustrating an embodiment of the process for treating pond water for increased water and phosphorus recovery.

Referring to FIG. 3 there is shown a process for treating plant pond water for increased water and phosphate recovery according to an aspect of the invention. Pond water 10 is mixed with slaked and diluted lime or other neutralizing base in a first stage neutralization and separation step 20, thus increasing the pH of the pond water resulting in the formation of precipitates. The precipitates are separated as the underflow to be processed for the first stage lime sludge disposal 30.

The resulting clarified liquid or supernatant from the first stage neutralization and separation step 20 is the overflow that is fed into the product generation and separation step 40. Also fed into the product generation and separation step 40 is the underflow/sludge from the final stage neutralization and separation step 60. This precipitate contains lime that was not consumed in the final stage neutralization and separation step 60 as well as residual phosphate that was not previously incorporated in prior rounds of the product generation and separation step 40. The lime provided by the sludge from the final stage neutralization and separation step 60 thus reduces the amount of lime that must be added to achieve the necessary stepwise increases in pH that are required here in the product generation and separation step 40 and, consequently, in the subsequent final stage neutralization and separation step 60. When the sludge/underflow from the final stage neutralization and separation step 60 is resuspended and reacted with the supernatant/overflow from the first stage 20 in the product generation and separation step 40, another precipitate forms, thus yielding the product 42. The product 42 is separated from the supernatant overflow, with the overflow being directed to the final stage neutralization and separation 60.

Additional slaked and diluted lime 12, or other neutralizing base, is added during the final stage neutralization and separation 60 to raise the pH of the input overflow. The rise in pH results in the precipitation underflow/sludge from the final stage neutralization and separation 60. This underflow/sludge is the material that is added to the product generation and separation step 40, along with the clarified liquid/overflow from the first stage 20. The overflow/supernatant from the final stage neutralization and separation 60 is treated for discharge 80 to reduce ammonia concentration (as necessary) and acidified to reduce the pH. The water is then suitable as discharge water 90.

The terms "first neutralization stage" and "final neutralization stage" as used herein are meant to be broadly construed. In the first neutralization stage the pH of the pond water is generally increased, thus yielding a more neutral aqueous solution. The pH is similarly increased in the final neutralization stage. However, depending upon how much the pH is increased, the solution may or may not be more neutral in the literal sense. Thus, reference to the stage as a final neutralization stage is not meant to indicate the solution is necessarily more neutral. Instead, the term is applied as a label for the stage to distinguish the stage from other stages in the process.

Additionally, the terms "first liming stage" and "final liming stage" are used interchangeably with the terms "first neutralization stage" and "final neutralization stage", respectively, and are meant to be broadly construed. While lime is often the compound used to increase the pH in the first liming stage, reference to the stage as the "first liming stage" is not meant to indicate that lime must be used to increase the pH of the solution unless otherwise specifically indicated. Instead, the term "first liming stage" is applied to the stage to distinguish it from other stages in the process.

Figure 4:
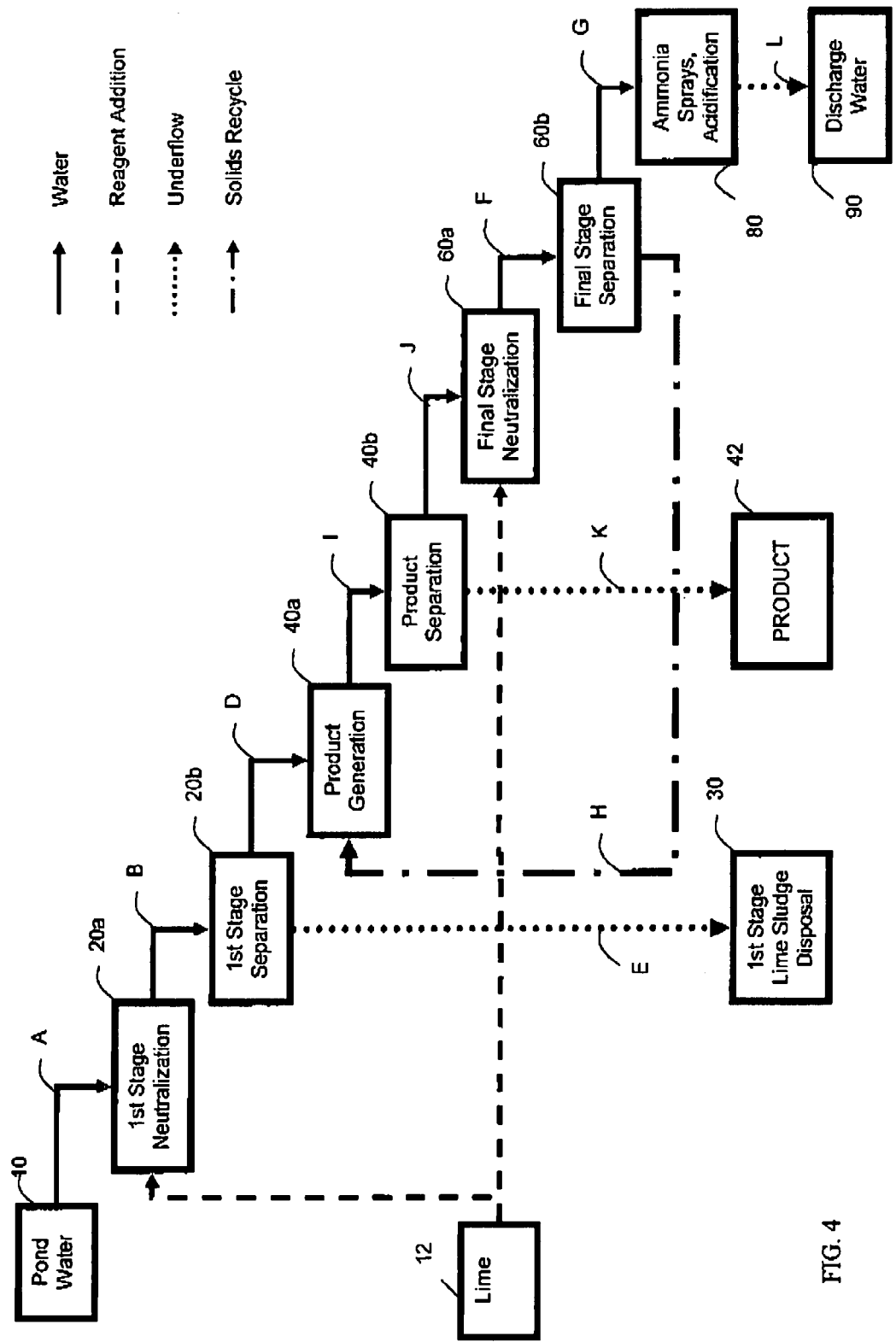
FIG. 4 is a flowchart providing a more detailed illustration of the process shown in FIG. 3.

Turning to FIG. 4 this is another illustration of the process of FIG. 3. As with the standard industry process, in the first neutralization stage 20a, lime 12 is mixed with pond water 10, stream A, to attain a pH of about 3 to 5, resulting in the precipitation of fluoride as $CaF_2$ and/or $CaSiF_6$. The limed water, stream B, is clarified in the first stage separation 20b, and the clarifier underflow sludge, stream E, that is produced is generally discarded by deposition in the sludge disposal area 30b. The clarified water, stream D, is directed to the product generation step 40a.

In the product generation step 40a the clarified water, stream D, from this first neutralization stage 20a is mixed with the solids, stream H, generated in the subsequent final neutralization stage 60a. This step is where the salable product is formed and separated. The product, stream K, is separated from the slurry and the product further dewatered prior to sale. The solids, stream H, contains lime that was not consumed in the final stage neutralization and separation step 60 as well as residual phosphate that was not previously incorporated in prior rounds of the product generation and separation step 40. The lime and hydroxy-apatite provided by the solids, stream H, from the final stage neutralization and separation step 60 thus reduces the amount of lime that must be added to achieve the necessary stepwise increases in pH that are required here in the product generation and separation step 40 and, consequently, in the subsequent final stage neutralization and separation step 60. When the solids, stream H, from the final stage neutralization and separation step 60 are resuspended and reacted with the clarified water, stream D, from the first stage 20 in the product generation and separation step 40, another precipitate forms, thus yielding the product 42, stream K. The product 42 is separated from the supernatant overflow, stream J, with the overflow being directed to the final stage neutralization and separation 60.

Additional lime is now added to the clarified liquid, stream J, from the product generation step 40 to achieve a pH of about 8-10, in the final neutralization stage 60*a*. In this final neutralization stage, the remaining phosphates are precipitated, stream H. The sludge, steam H, from the final neutralization and separation stage 60, is sent to the product generation step 40 as opposed to being discarded, or recycled to the first neutralization stage 20.

When pond waters containing unacceptable levels of soluble ammonia are processed, the final stage system can be operated at a higher pH, from pH 10 to 12.

Lime is not very soluble in high pH water, and as a consequence, the high pH final neutralization stage underflow solids slurry, stream H, contains large amounts of un-reacted lime. In addition, this sludge, stream H, is very voluminous because of its hydroxyl nature and between 20 and 40% of the total water in this final neutralization and separation stage 60 is removed with the sludge, stream H. The solids in this sludge do not compact well on standing and is only about 7% solids by weight. By recycling this final stage neutralization sludge, stream H, to the more acidic first stage clarified water, stream D, in the product generation step 40, with good agitation, we dissolve the un-reacted lime and react most of the voluminous solids to produce mono and di-calcium phosphate. The mono and di-calcium phosphate slurry, stream K, compacts to almost 30% solids upon clarification. The solids are removed as a 30% solids slurry rather than a 7% solids slurry. This fact increases the amount of releasable clarified water produced by this system greatly, when compared with the conventional double liming process, and the recovery of un-reacted lime is significantly improved.

Figure 5:
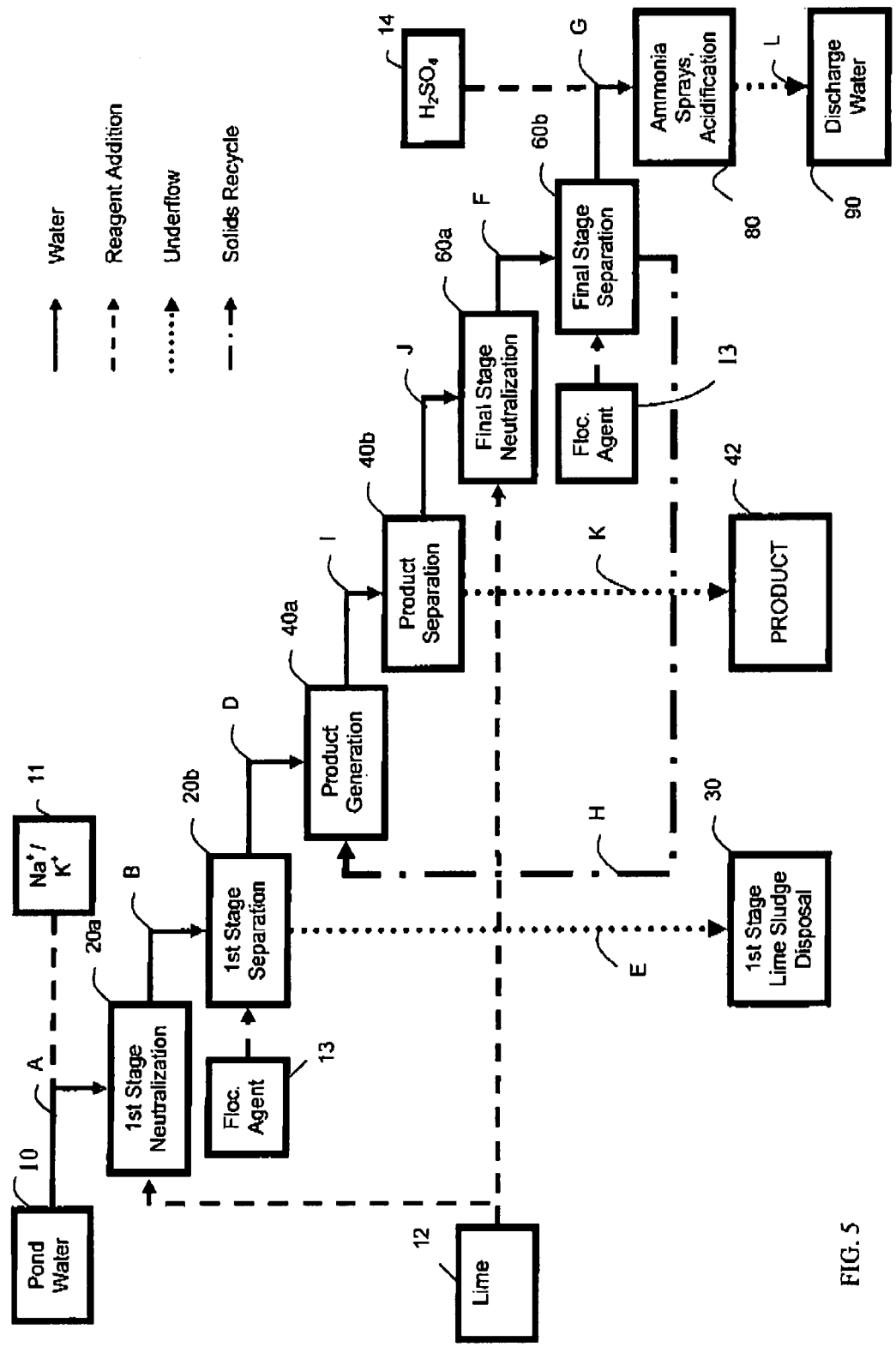
FIG. 5 is a flowchart illustrating an alternative embodiment of the process for treating pond water for increased water and phosphorus recovery depicted in FIG. 3.

Turning to FIG. 5 there is a process for treating plant pond water for increased water and phosphate recovery according to another aspect of the invention. In the process as shown in FIG. 5 a base 12 or bases is added to the pond water 10, stream A for the first stage neutralization 20*a*. The base 12 can be a calcium compound (e.g. $CaCO_3$, $Ca(OH)_2$ or $CaO$) and/or sodium compound (e.g. NaOH, $NaHCO_3$, $Na_2CO_3$) and/or potassium compound (e.g. KOH, $KHCO_3$, $K_2CO_3$) or ammonia and/or ammonia salts etc., that will react with the acids allowing the soluble fluoride and some of the phosphate species present to precipitate until an acceptable phosphorus and fluoride content in the remaining liquid is achieved. The addition of a sodium and/or potassium salt can be advantageous due to the preferential precipitation of sodium and potassium fluorosilicates, followed by the further precipitation of fluorides and fluorosilicates with additional lime or other base. The resultant reaction product is clarified in the first stage separation 20*b* and the separated solids, stream E, disposed of in the sludge disposal area 30*b*.

The clarified water, stream D, from the first liming neutralization stage 20*a* is now reacted with the solids, stream H, produced from the final neutralization stage of liming. The step is called the product generation step 40*a*. These resultant solids are separated from the water by settling and or filtration and further processed by conventional means to give a dried or semi-dry final product 42. This material, containing high levels of phosphate and minimal levels of fluoride and metals, is suitable for use in animal feed supplements or other applications where a high phosphate containing material with enhanced purity is desired. In addition, the materials can be further processed by conventional means to attain a purified technical grade phosphoric acid. The resultant material is a valuable product as opposed to a voluminous waste that must normally be impounded at some significant cost to the facility.

The supernatant, stream J, produced in the product generation step 40*a* is directed to the final stage neutralization 60*a*. Lime 12 is added to the calcified clarified (i.e. stream J) water, which has a pH of about 6 to about 7.5 to again raise the pH to the appropriate level to precipitate the majority of the residual phosphate. The increase in pH results in precipitation which is separated in the final stage separation 60*b*, thus producing the solids, stream H, to be recycled to the clarified water, stream D, from the first stage neutralization and separation 20 of the process. Any un-reacted lime and phosphates in the final neutralization stage solids, stream H, will be consumed as the solids are recycled back into the clarified water, stream D, of the first stage neutralization and separation 20 thus producing a fairly pure calcium phosphate material, and also reducing the overall lime consumption further. In conventional double liming processes, the final neutralization stage solids are generally discarded, and not recycled, thus the value of the un-reacted lime in those solids are lost.

The first neutralization stage 20*a* and final neutralization stage 60*a* are manipulated to achieve pH targets that ensure the product has an acceptable phosphorus to fluoride ratio. The difference in the phosphorus concentration of the clarified water, stream D, at the first liming separation stage 20*b* to that of the phosphorus concentration of the clarified water, stream J, at the product separation stage 40*b*, divided by the difference in the fluoride concentration of the clarified water, stream D, at the first liming separation stage 20*b* to that of the fluoride concentration of the clarified water, stream J, at the product separation stage 40*b* must be greater than 100 in order to achieve a feed grade product 42. Mono and di-calcium phosphates are sold as animal feed supplements. One of the regulatory requirements governing their sale is a P to F ratio of 100 or greater. The pH of the first and pH of the final stage liming stages are thus manipulated to achieve the desired respective phosphorus and fluoride concentrations, and to maximize the recovery of phosphate values. In addition, the final stage pH is further optimized to achieve acceptable heavy metal content in the product. Such manipulations and optimizations are within the capabilities of one of skill in the art.

Following the separation and recycle of the solids, the resultant clarified final stage limed pond water, stream G, can be further treated 80 in preparation for discharge 90. The clarified final stage pond water, stream G, can be treated to reduce the pH to between 6.5 and 8 such that the water can meet discharge quality requirements. In the treatment of phosphoric acid process pond waters containing unacceptable levels of soluble ammonia, the pH is further elevated above 9, and preferably to between 10 and 12, such that residual ammonia can be removed by aerial spraying and air stripping. Even without the addition of a spray system, operation at a pH greater than 9 will result in the removal of ammonia through volatilization if large surface areas are available for such evaporative activity. The treated water, now having a significantly reduced ammonia concentration, can be further treated to reduce the pH to between 6.5 and 8 such that the water can meet discharge quality requirements.

As indicated above, and with reference to the first stage neutralization and separation 20 of FIG. 5, if the silica value (SiO$_2$) in the pond water 10 is high>0.2%, water soluble sodium and/or potassium containing materials can be added. The solids in the stream are then allowed to separate or the entire stream can be mixed with an amount of neutralizing base material, such as hydrated lime slurry in a suitable vessel with the purpose of raising the pH to approximately 3 to 5. For the first neutralization stage, calcium carbonate or other bases could be used. However, hydrated lime is generally an advantageous material for the process. In the final neutralization stage 60$a$, hydrated lime should be used. The reacted slurry, stream B, is mixed with a flocculating agent 13. The resulting flocculated mixture is introduced into a clarification device for the first stage separation 20$b$ where the liquid and solids phases separate. The clarification device typically used in the industry is a conventional clarifier, using gravity to settle the solids with the aid of a flocculant. A filter could be used, but would generally be more costly. The solid phase, stream E, is withdrawn and deposited into a sludge disposal area 30 for dewatering and consolidation. The clarified first neutralization stage water, stream D, is then mixed with the underflow, stream H, from the final neutralization and separation stage 60. The recycled solids, stream H, thus react with the first stage water, stream D, and precipitate a product, stream K, containing high levels of phosphate, but low levels fluoride, silicates and metals. Following the separation of the resultant solid by filtration, settling or other conventional separation means, the product can be dried and further processed to produce a material acceptable for sale.

If there is a significant content of silica left in the pond water, stream J, the silica not precipitated in the first liming stage 20 will hydrolyze and form gels and emulsions making difficult the precipitation and separation of the product and also the separation of the material to be recycled from the final stage liming stage. In these circumstances, as will be described later and shown in FIGS. 6 and 7, the clarified water, stream J, from the product separation stage 40 is allowed to age for a sufficient time after the product separation to hydrolyze the silica which is then separated by conventional processes in an intermediate step, prior to final stage neutralization. The pH can be elevated with base to accelerate the silica hydrolysis, but this again looses some phosphate, thus a degree of optimization is necessary.

The clarified water, stream J, is now directed to the final stage neutralization 60$a$ where it is mixed with an additional quantity of neutralizing base material, such as hydrated lime slurry, in a suitable vessel with the purpose of raising the pH to approximately 9 to 10. The reacted slurry, stream F, is mixed with a flocculating agent and the flocculated mixture is introduced into another clarification device where the liquid and solid phases are allowed to separate. The underflow, stream H, containing the residual phosphate values is recycled to the product generation step 40$a$ and mixed with the clarified water, stream D, from the first liming and separation stage 20 to generate the product previously described. The liquid phase, stream G, from the final neutralization and separation stage 60 can then be discharged 90 following adjustment of the pH 80 with an acid to achieve near neutrality. However, if the liquid phase, stream G, from the final neutralization stage requires processing to remove ammonia 80, additional base is added in the final neutralization step 60$a$ to raise the pH from the normal 9 to 10, to a higher range of 10 to 12, and following spray evaporation to achieve an acceptable ammonia concentration 80, the pH is adjusted with an acid, stream 14, to achieve the near neutrality required for discharge.

A process according to the present invention thus generates additional phosphate product, thus recapturing phosphate species not captured in the wet process phosphate production. The phosphate is produced in a step intermediate to a first and final stage neutralization and by employing this additional step the product is generated from the subsequent final lime neutralization stage solids. The phosphate-containing product is separated by settling and or filtration and further processed by conventional means to give a dried or semi-dry final product. This material is a valuable product as opposed to a voluminous waste that must normally be impounded through conventional processes such as double liming. In addition, the material can be further processed by acidification and by separation of the insoluble calcium salt, to liberate a purified phosphoric acid.

The clarified water produced in the product generation step, is then limed in the subsequent final neutralization stage to produce the material that is recycled to form the phosphate product. If lime is used to achieve the intermediate stage pH (See FIGS. 8 and 9), rather than the recycled sludge from the final stage neutralization and separation, then the resultant solids from the final stage are discarded or reprocessed in the phosacid facility due to their low grade, including low quantity of phosphate. Under this scenario, lime consumption is greater, but the process still yields a high grade phosphate product in the product generation step. The clarified water from the final neutralization stage can now be treated to further reduce the ammonia content and be the pH adjusted to neutrality prior to discharge.

Referring back to FIG. 5, the only major materials left in solution, stream G, at a high pH before aeration are: ammonia, (or ammonium ion), calcium, sodium and sulphate ions, e.g. (NH$_4$)$_2$SO$_4$, N OH, Ca(OH)$_2$, CaSO$_4$, NaOH, and Na$_2$SO$_4$. These materials account for the vast majority of the residual conductivity. During the aeration stage 80 to remove ammonia by volatilization, the ammonia is removed by ensuring that a high enough pH is achieved to ensure the vast majority of the ammonia is in the unionized form and thus volatile. The reaction can be characterized as follows:

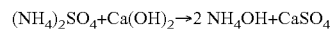

$$(NH_4)_2SO_4 + Ca(OH)_2 \rightarrow 2\ NH_4OH + CaSO_4$$

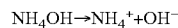

$$NH_4OH \rightarrow NH_4^+ + OH^-$$

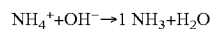

$$NH_4^+ + OH^- \rightarrow 1\ NH_3 + H_2O$$

The high pH drives the reaction to the right and increases the unionized ammonia concentration and thus volatility.

As a result of the ammonia volatilization, and thus the loss of the ammonia alkalinity, the pH of the water is lowered slightly, resulting in a new equilibrium between the calcium, sodium and sulphate, e.g. Ca(OH)$_2$, CaSO$_4$, Na$_2$SO$_4$, and NaOH in solution. The addition of acid will now be required to lower the pH to that suitable for discharge 90.

Since this water is not now saturated with calcium sulphate, it can be sent to ultra-filtration or reverse osmosis (R.O.) units to provide all or part of the fresh water needed for the dilution. The high sodium (high conductivity) reject can be sent back to the original pond water, where the sodium would precipitate as Na$_2$SiF$_6$. In addition, since the sodium salts in the reject are very soluble, this water could be used as sealing water for pumps or as cooling water lowering fresh water usage needed in water treatment.

Figure 6:
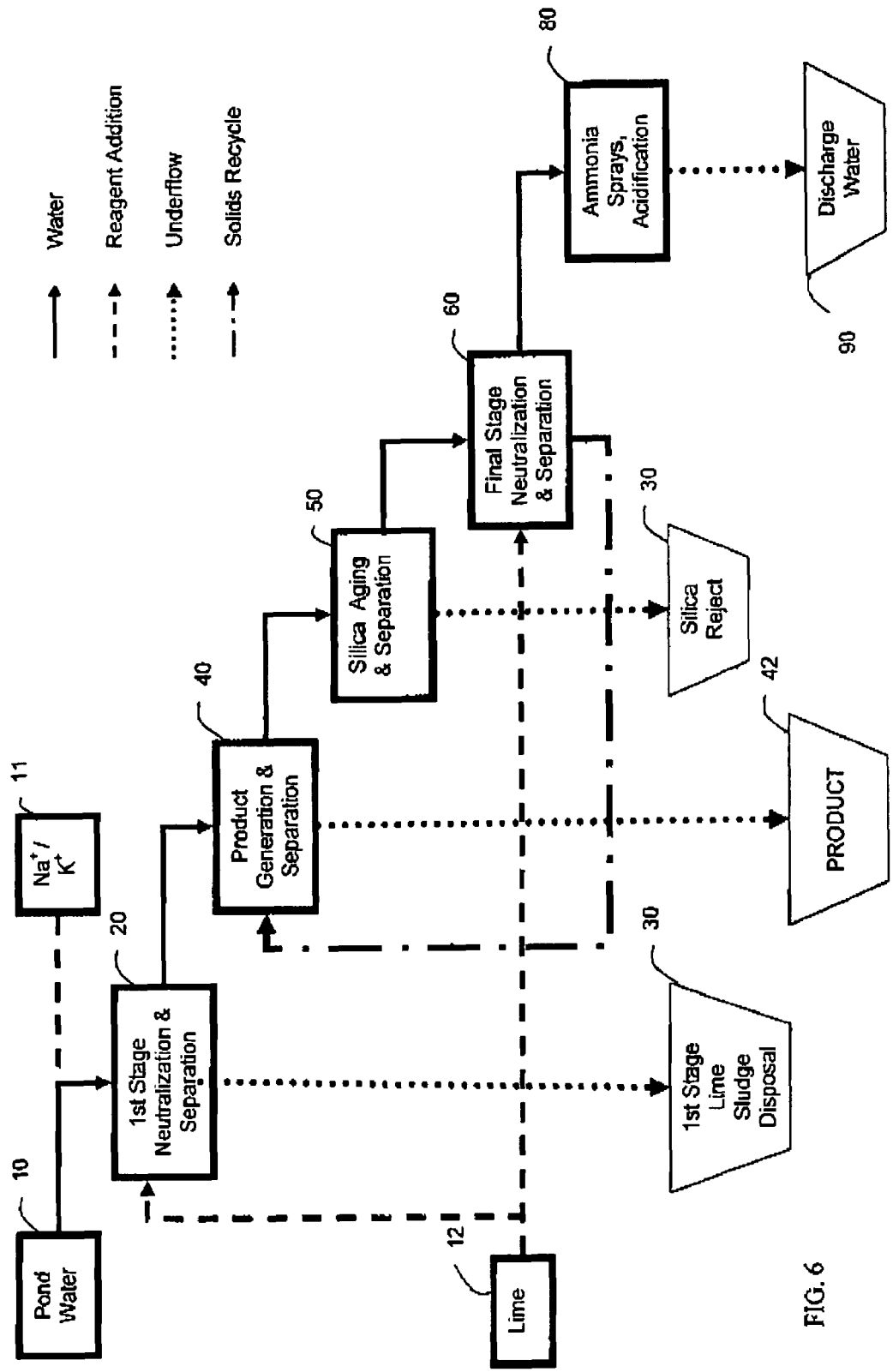
FIG. 6 is a flowchart depicting an alternative embodiment of the process depicted in FIG. 3.
Figure 7:
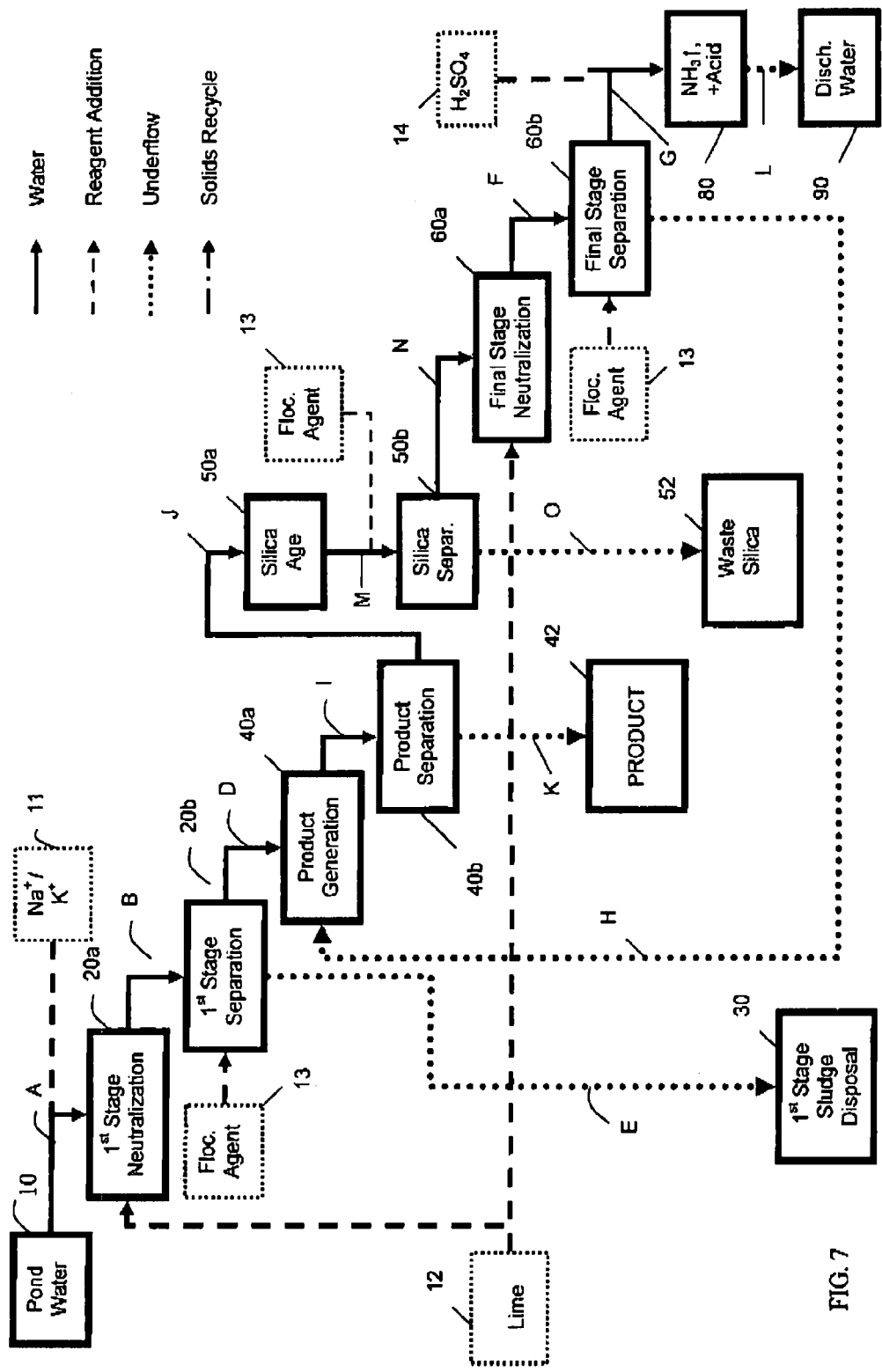
FIG. 7 is a flowchart providing an alternative illustration of the process shown in FIG. 6.

The process outlined in the flowcharts described above, such as FIG. 5, may be modified where elevated levels of fluoride and fluorosilicates are present. Referring to FIG. 6 there is shown an overview of the process employing a silica ageing, and separation step 50. Referring to FIG. 7, the silica aging process is shown in more detail.

The majority of phosphoric acid plant pond waters are contaminated with significant quantities of fluoride and fluorosilicates, thus when they are treated and the pH elevated, the fluorosilicates, not precipitated adequately in the first neutralization and separation stage 20, hydrolyze to a hydrated form of silica. The hydrated silica will form in the final neutralization and separation stage 60, if not removed, and will be carried back to the product generation step 40, and could un-acceptably dilute the grade of the product.

It is known that hydrated silica, $SiO_2 \cdot xH_2O$, even as little as around 0.50% by weight, will gel water, in a manner analogous to the making of gelatin. In the pond water 10, there is a mixture of fluorosilicic acid, $H_2SiF_6$, and some free fluoride ion, and sodium and potassium ions. As the pH is raised by the hydrated lime, the following reactions result:

$$H_2SiF_6 + Ca(OH)_2 \rightarrow CaSiF_6 + 2H_2O$$

$$CaSiF_6 \leftrightarrow CaF_2 + SiF_4$$

$$3SiF_4 + xH_2O \rightarrow 2H_2SiF_6 + SiO_2 \cdot xH_2O$$

$$2H_2SiF_6 + 2Na^+ + 2K^+ \rightarrow Na_2SiF_6 + K_2SiF_6 + 4H^+$$

Small additions of sodium and potassium can be added to precipitate as much fluorosilicate as achievable, and can be added just prior to the lime addition in the first neutralization stage 20a. The addition will limit the quantities of hydrated silica that would need to be removed subsequently. The resultant precipitated solids are separated by clarification processes 20b and disposed of together with the first neutralization stage solids, stream E, to an impoundment 30 or other suitable location. The addition of the sodium and/or potassium salt can be advantageous due to the preferential precipitation of sodium and potassium fluorosilicates, followed by the further precipitation of fluorides and fluorosilicates with additional lime or other base.

An important difference between the process embodiments previously outlined above and the embodiment that separates the hydrated silica is an ageing, clarification and separation step 50 is that is carried out after the product generation step 40a, and before further lime is added in the final neutralization stage 60a.

As in the embodiments (such as in FIG. 5), a base or bases, such as hydrated lime, is added to raise the pH to about 3 to 4, allowing the soluble fluoride and some of the phosphate species present to precipitate until an acceptable phosphorus and fluoride content in the remaining liquid is achieved. The resultant reaction product, stream B, is clarified, stream D, and the separated solids disposed of, stream E.

The clarified water from this first liming neutralization stage, stream D, is now reacted with the solids produced from the final neutralization stage of liming, stream H, in product generation step 40a. These resultant solids, stream K, are separated from the water by settling 40b and or filtration and further processed by conventional means to give a dried or semi-dry final product 42.

Now, due to the expected hydrolysis of the fluorosilicate, the clarified water, stream J, is allowed to age 50a for an extended period of time. The rate at which the silica hydrolysis proceeds is dependant upon the pH and sufficient time is allowed for the reaction to essentially complete.

The resultant aged water, stream M, containing hydrated silica is flocculated and separated by clarification in the silica separation step 50b. The resultant separated silica, stream C, is discarded to a containment area 52. The quantity of this silica is quite small compared with the voluminous streams generated by the other stages.

Lime is now added to the resultant clarified water, stream N, which still has a pH of about 6 to about 7.5 to again raise the pH to the appropriate level to precipitate the majority of the residual phosphate values, thus producing the solids, stream H, to be recycled to the clarified water, stream D, from the first lime neutralization and separation stage 20 of the process.

Figure 8:
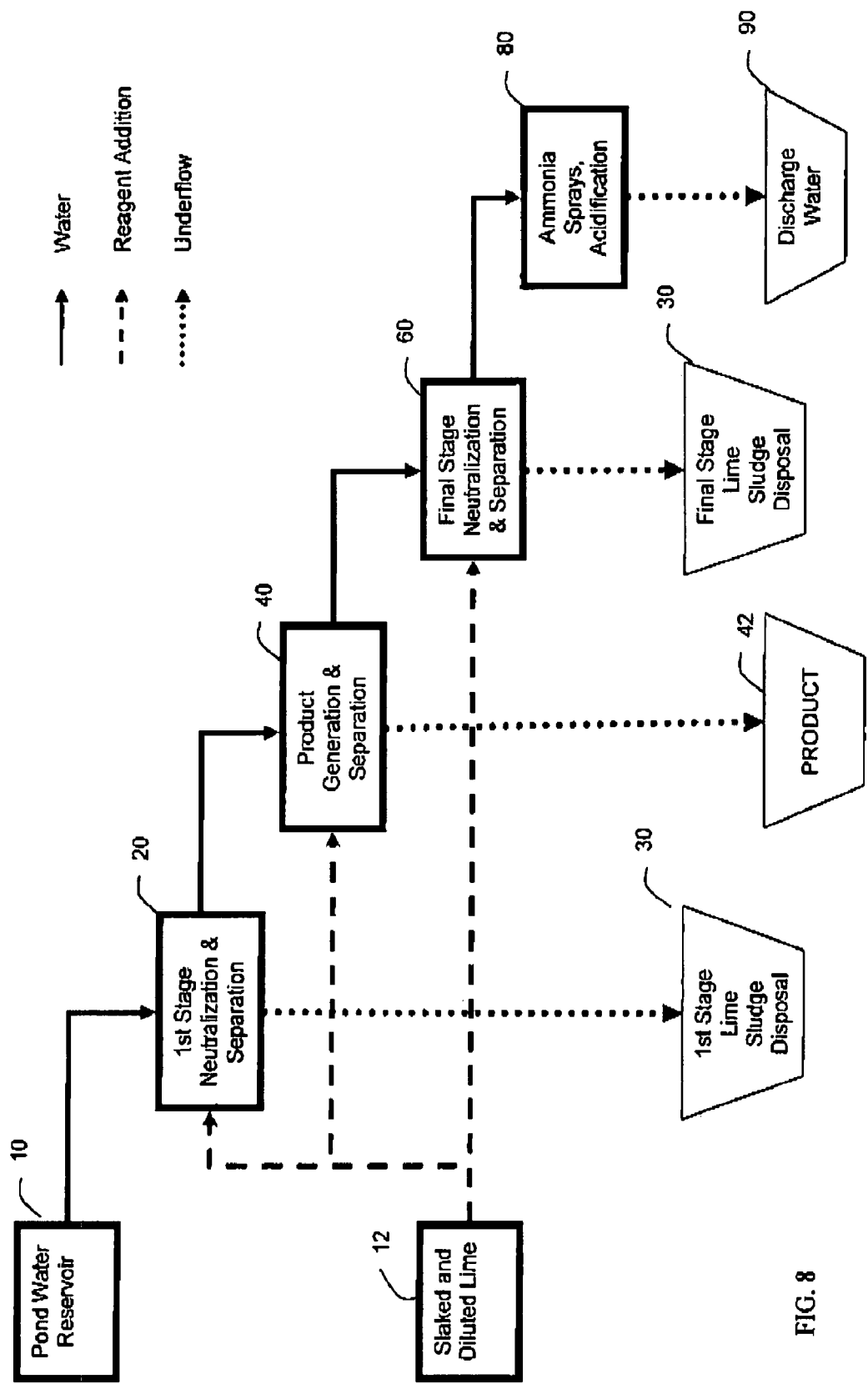
FIG. 8 is a flowchart depicting an alternative embodiment of the process depicted in FIG. 3. The process depicted in FIG. 8 includes a product generation and separation step following the first stage neutralization and separation. The process depicted in FIG. 8, however, does not recycle the sludge from the final stage neutralization and separation step, but instead passes the sludge out for other disposal.
Figure 9:
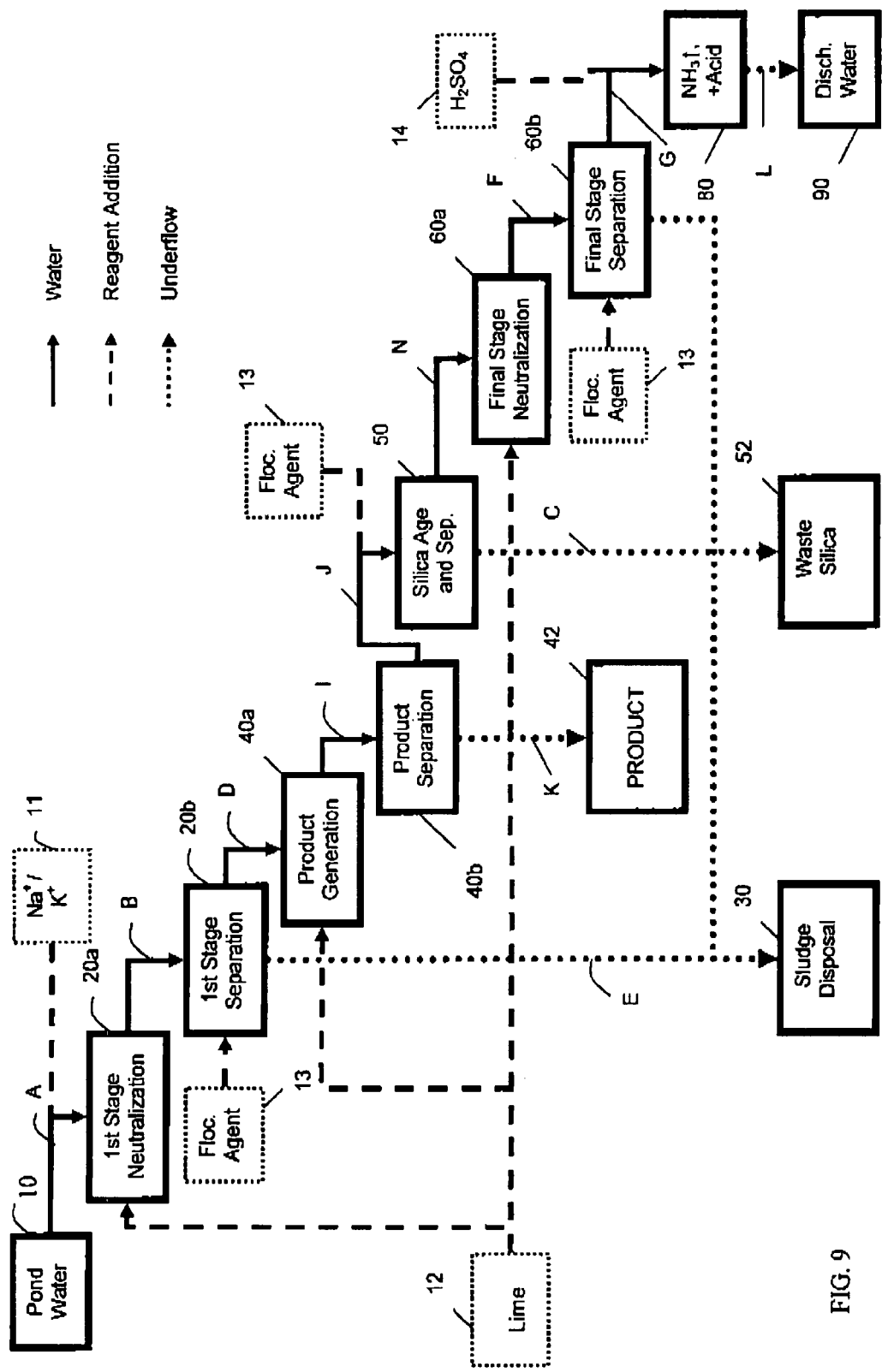
FIG. 9 is a flowchart providing an alternative illustration of the process shown in FIG. 8.

Turning now to FIG. 8, a further modification of the process can be accomplished by using lime in the product generation step 40 to raise the clarified water produced, stream D, from the first neutralization and separation stage 20, to a pH of about 5 to about 7.5 and thus form the product 42 rather than the use of the solids, stream H, generated by the final neutralization and separation stage 60. This is shown in detail in FIG. 9. One consideration in performing the process as embodied in FIG. 9 is that the phosphate values still present in the resultant water, stream F, will be lost and the yield of product substantially reduced. In addition, there will be no reduction in lime costs necessary to treat the water, but the process is somewhat simpler to implement as the silica will not need to be separated as the final neutralization solids would be simply discarded The invention is described below in examples which are intended to further describe the invention without limitation to its scope.

EXAMPLE

Figure 2:
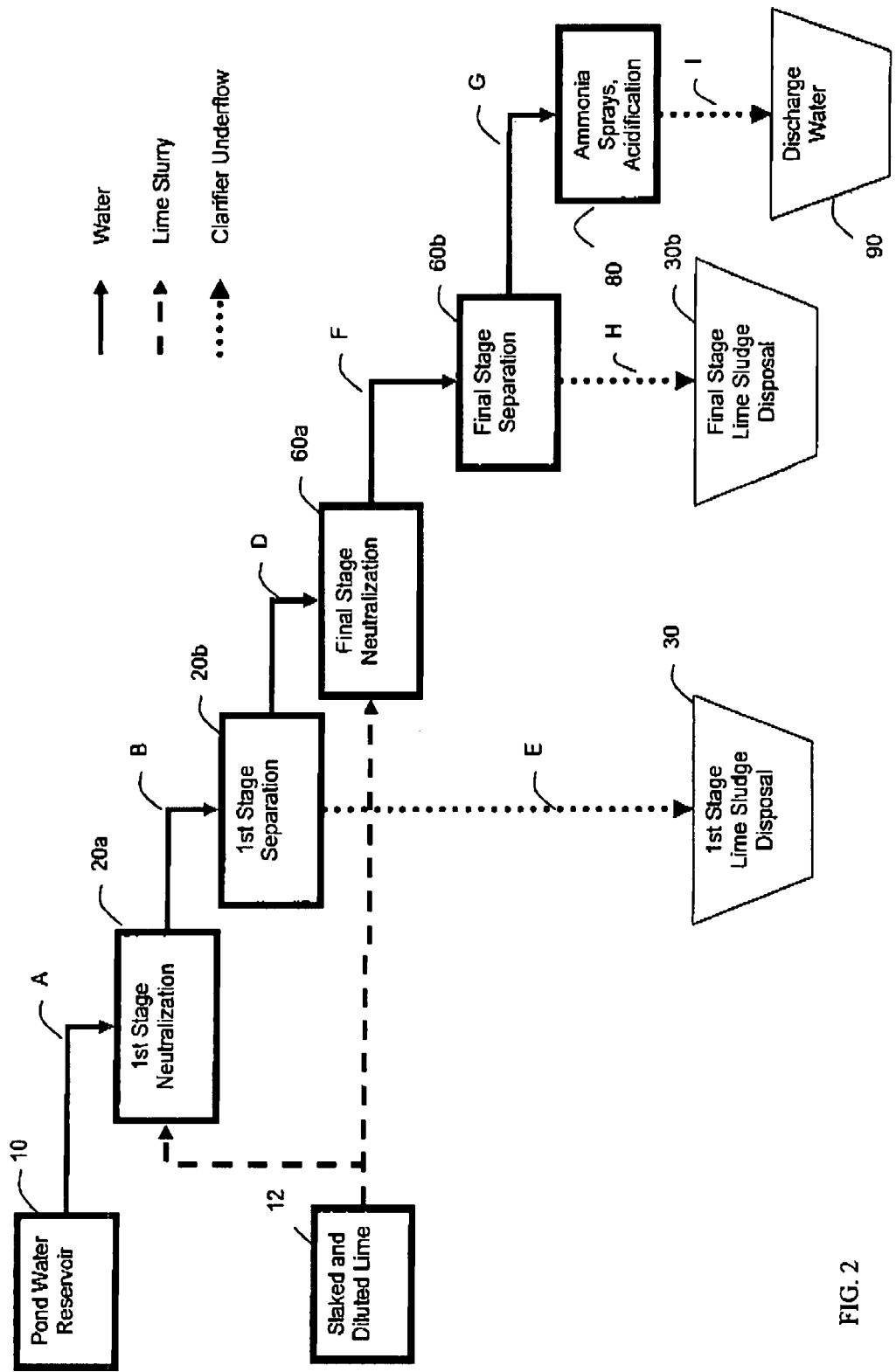
FIG. 2 is an alternative illustration of the double liming process as shown in FIG. 1.

Pond Water Phosphate Product Recovery Process with Concomitant Increased Water Recovery and Decreased Lime Usage A small-scale set of trials were conducted to further illustrate the invention. The results of the trials are presented in the examples below. The first example demonstrates product recoveries using the standard double liming process as is generally outlined in FIGS. 1 and 2. As is apparent in the figures, such as FIG. 3, an aspect of the present invention involves the recycle of the final neutralization stage underflow solids to recycle to the first neutralization stage clarified water. Given that this aspect of the new product process as described uses the final neutralization stage underflow solids to recycle to the first neutralization stage clarified water, an initial experiment was needed to generate that recycle stream. Thus, the first example describes the process whereby lime is used to raise the pH of the first stage clarified water to around 6 (as opposed to the use of the recycle solids), such that further lime can be added to generate the final neutralization stage underflow. Such a process is delineated in FIGS. 8 and 9. In addition, the fluoride and silica content of the pond water used in these tests was indeed quite elevated such that the silica separation step, depicted by FIGS. 6 and 7, was followed.

Example 1

Standard Double Lime Process at 1st Stage pH 3.8 and 4.5

Lime Slurry was added, with agitation, to Phosphoric Acid Plant Pond Water to raise the pH from ~1.7 to between 3 and 4 ($1^{st}$ Stage or liming). The suspension was allowed to settle and water recovered ($1^{st}$ Stage clarification). Additional Lime was added to raise the pH to between 10 and 12 (2nd Stage neutralization or liming). The suspension was allowed to settle and the treated water recovered ($2^{nd}$ stage clarification). Both sludge streams from both $1^{st}$ and $2^{nd}$ stage clarifications are normally discarded. In addition an alternate intermediate pH of 4.5 was also chosen, as many commercial processes operate at this pH. The amount of lime used and the water recovered corresponds to that normally observed during conventional industrial Double Liming.

1.1. Initial pH Pond Water—1.7 to 3.79

To 2000 grams pond water, we added 176 grams 15% CaO Slurry with agitation. We allowed the suspension to settle and decanted 1925 grams of pH 3.79 water and had 250 grams of Underflow.

1.2. Clarified 1st Stage Water—3.79 to 11.02

To 1925 grams water of the clarified first stage water, we added 96 grams of 15% CaO Slurry with agitation. The suspension was allowed to settle and decanted 1600 grams of 11.02 pH water. The volume solids were about 420 ml. The product was allowed to settle for about 20 minutes.

pH Clarified Product Water—11.02

FOR 2000 grams Pond Water via 3.79 pH

To pH 3.79-176 grams 15% CaO slurry used

From pH 3.79 to 11.02—96 grams 15% Lime Used

Total weight 15% CaO Used—272 grams/1600 mls of treated water (212# CaO/1000 gallons)

Recovery by Volume

Initial weight 2000 gms and water in lime+(176*.85)+(96*.85)=2231 gms

Recovered=1600 gms

Overall Recovery—1600/2231'=71% Recovery 1.3. Initial pH Pond Water—1.7 to 4.5

To 2000 grams pond water, we added 204 grams 15% CaO Slurry with agitation. The suspension was allowed to settle and decanted 1900 grams of pH 4.5 water and had 300 grams of Underflow.

1.4 Clarified $1^{st}$ Stage Water—4.5 to 11.02

To 1900 grams water of the clarified first stage water, we added 92 grams of 15% CaO Slurry with agitation. We allowed the suspension to settle and decanted 1600 grams of 11.02 pH water. The volume solids were again about 400 ml. We only allowed the product to settle for about 20 minutes.

FOR 2000 gms Pond Water via 4.5 pH

To pH 4.5-204 grams 15% CaO slurry used

From pH 4.5 to 11.02—92 grams 15% Lime Used

Total weight 15% CaO Used—296 grams/1600 mls of treated water (231#CaO/1000 gallons)

Recovery by Volume

Initial weight 200 gms and water in lime+(204*.85)+(92*.85)=2251 gms

Recovered=1600 gms

Overall Recovery—1600/2251'=71% Recovery

Example 2

Pond Water Phosphate Recovery Process Using Lime to Generate the Phosphate Product Lime Slurry was added, with agitation, to pond water to raise the pH to between 3 and 4 ($1^{st}$ stage neutralization). The suspension was allowed to settle and the clarified water recovered ($1^{st}$ stage clarification or "$1^{st}$ stage separation"). Additional lime was added to raise the pH to between 5 and 7 (product formation or "product generation"). The suspension was then allowed to settle and the resulting clarified water was recovered (product separation). Additional lime was added a third time to raise the pH to between 10 and 12 ($2^{nd}$ stage neutralization). The resulting suspension was allowed to settle and the clarified water separated ($2^{nd}$ stage clarification or "$2^{nd}$ stage separation"). The underflow solids from the $2^{nd}$ stage liming were then recycled to $1^{st}$ stage clarified water for the product formation step. The amount of water recovered and lime used were determined. (See Recovery and Lime Usage Results). The amount of lime used and the water recovered in this example would correspond to the amounts as would be expected with a double liming process.

Recovery Tests:

2.1. Initial pH of pond water—1.57 to 3.44 ($1^{st}$ Stage Neutralization and Clarification).

To 2000 grams of pond water containing 6250 ppm P, and 7000 ppm F, we added 171 grams 15% CaO slurry with agitation. The suspension was allowed to settle and decanted 2011 grams of pH 3.44 water and 160 grams of underflow.

2.2. Clarified $1^{st}$ stage water—3.44 to ~6.14 (New Product Generation Step—LIME used).

To 1900 grams of the pH 3.44 water, a quantity of 56.4 grams 15% CaO slurry was added with agitation. The suspension was allowed to settle and decanted 1813 grams of 6.14 pH water. A mass of 194.4 grams of phosphate product underflow was yielded. The volume of solids were about 175 ml. The product was to settle for about 20 minutes before it was centrifuged. This yielded 116.37 grams of centrifuged solids containing 31% solids. The product could be further de-watered by vacuum filtration. The product was dried and analyzed. The product contained 18.56% P and 0.1% F. i.e. over the desired 100:1 P:F ratio. No gelling was seen on standing over night, and a little silica was observed to have formed.

2.3. Silica Separation Step.

On standing overnight, 21 grams of solids were formed but which contained only 4% solids and were predominantly hydrated silica.

2.4. Clarified product water—6.14 to 11.1 ($2^{nd}$ Stage Neutralization and Clarification).

To 1650 grams of the pH 6.14 water, we added 39.75 grams 15% CaO Slurry with agitation. The suspension was allowed to settle and decanted the 11.1 pH water. Recovery was about 1400 grams of clarified water and the underflow was found to be 259 grams.

Example 3

Pond Water Phosphate Recovery Process Using Recycled Solids to Generate the Phosphate Product 3.1. Next initial pH pond water—1.57 to 3.47 ($1^{st}$ Stage Neutralization and Clarification)

To 2000 grams of the original pond water we added 176 grams 15% CaO Slurry with agitation. The suspension was allowed to settle and the clarified water was then decanted.

3.2. Clarified 1$^{st}$ stage water—3.47 to 5.85 (New Product Generation Step (FIRST))

To the 1900 grams of the pH 3.47 water, we added the 259 grams of underflow produced from the pH 11.1 water, with agitation. The pH was raised to 5.85. 123 grams of product were found to comprise 25% solids, and were assayed to contain 17.3% P and 0.09% F.

3.3. Silica Separation Step.

On standing overnight, 112.7 grams of solids were formed which contained 7% solids and were predominantly hydrated silica.

3.4. Clarified product water—5.85 to 11.5 (2$^{nd}$ Stage Neutralization and Clarification)

To 1860 grams of the pH 5.85 water, we added 84.36 grams 15% CaO Slurry with agitation. The suspension was allowed to settle and 11.5 pH water was then decanted. About 1700 grams of clarified water was recovered and the underflow was found to be 326 grams.

3.5. Next Initial pH pond water—1.57 to 3.99 (1$^{st}$ Stage Neutralization and Clarification)

A second iteration was performed with additional pond water. To 2000 grams of the original pond water we added 173 grams 15% CaO Slurry with agitation. The suspension was allowed to settle and the clarified water was decanted.

3.6. Clarified 1$^{st}$ Stage Water—3.99 to 7.5 (New Product Generation Step (SECOND))

To the 1725 grams of pH 3.99 water we added the 326 grams of underflow produced from the pH 11.5 water, with agitation. The pH was raised to 7.5. 1610 grams of clarified water was produced and 402 grams of product were found to comprise 21.5% solids, and were assayed to contain 15.56% P and 0.11% F.

4. Results 4.1. No recycle of final stage material (as in FIGS. 8 and 9).

FOR 1900 grams of pond water:

To pH 3.44—used 171 grams 15% CaO slurry used, from pH 3.44 to 6.14 used 56.4 grams, and from pH 6.14 to 11.10 used 39.75 grams of 15% Lime Used Total weight 15% CaO was 267.15 grams for 1440 grams of treated water, or 231 #CaO/1000 gallons. The water recovery was 68%. Both values being comparable to the standard double liming process, as exemplified earlier.

4.2. With recycle of final stage material (as in FIGS. 6 and 7).

FOR 2000 grams of pond water:

To pH 3.47—used 176 grams 15% CaO slurry used, from pH 3.47 to 5.85 used no lime slurry, from pH 5.85 to 11.5 used 84.36 grams of 15% Lime Used Total weight 15% CaO used was 260.36 grams for 1700 grams of treated water, or 192 #CaO/1000 gallons. The water recovery was 77%. Both values being improved over the standard double liming process, as exemplified earlier.

The disclosure of all publications cited above are expressly incorporated herein by reference, each in its entirety, to the same extent as if each were incorporated by reference individually.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between. Now that the invention has been described,

What is claimed is:

1. A process for treatment of pond water from phosphoric acid production comprising the steps of:

performing a first liming stage comprising the steps of:

increasing the pH of the pond water to form a first liming stage precipitate; and separating the first stage precipitate from the aqueous solution to obtain a clarified water, wherein the first stage clarified water has a phosphorus and fluorine concentration of P1 and F1;

performing a product generation stage comprising the steps of:

mixing the clarified water with solids from a final liming stage to form a product generation stage precipitate, and separating the product generation stage precipitate from the aqueous solution to obtain a solid product and a re-clarified water wherein the solid product contains di-calcium phosphate values precipitated from the pond water;

wherein the product generation aqueous solution has a phosphorus and fluorine concentration of P2 and F2, such that the concentration of P1 minus the concentration of P2 divided by the concentration of F1 minus the concentration of F2 is greater than 100;

performing a final liming stage comprising the steps of:

adding lime to increase the pH of re-clarified water to form a final liming stage precipitate;

separating the final stage precipitate from the water to form the solids from the final liming stage and the clarified treated water, wherein the solids from the final liming stage are the solids added in the product generation stage; and directing the clarified treated water for further use, treatment, or disposal.

2. The process according to claim 1 wherein the pond water is generated from the wet process phosphoric acid production process.

3. The process according to claim 1 wherein the pH is increased in the first liming stage with a base selected from the group consisting of $CaCO_3$, $Ca(OH)_2$, $CaO$, $NaOH$, $NaHCO_3$, $Na_2CO_3$, $KOH$, $KHCO_3$, $K_2CO_3$, ammonia and ammonia salts.

4. The process according to claim 1 wherein the step of increasing the pH of the pond water in the first liming stage is performed by the addition of a base in a quantity sufficient to result in a pH of about 3.0 to about 5.0.

5. The process according to claim 1 wherein the solids from the final liming stage are added in sufficient quantity to raise the pH of the product generation clarified water to the range from about 4.0 to about 7.0.

6. The process according to claim 1 wherein the solids from the final liming stage are added in sufficient quantity to raise the pH of the product generation clarified water from about 5 to about 7.5.

7. The process according to claim 1 further comprising the step of processing the solid product from the product generation stage at greater than 100:1 phosphorus to fluoride ratio as an animal feed supplement or feedstock for technical grade phosphoric acid production.

8. The process according to claim 1 further comprising the step of adding an anionic or non-ionic flocculating agent prior to the step of separating the first liming stage precipitate from the water, whereby the flocculating agent enhances the sedimentation of the precipitate.

9. The process according to claim 1 further comprising the step of adding an anionic or non-ionic flocculating agent at the product generation stage, prior to the final liming stage.

10. The process according to claim 1 wherein a quantity of lime is added to product generation clarified water to form the final liming stage precipitate in a quantity sufficient to result in a pH of about 9.0 to about 12.0.

11. The process according to claim 1 further comprising the steps of:
holding the re-clarified product generation stage clarified water in a silica aging stage for a time period sufficient to allow silicic acid present in the clarified portion to decompose into a hydrated silicon dioxide sludge;
gently agitating the clarified water to allow decomposition of silicic acid into resultant silicon dioxide; and
separating the hydrated silicon dioxide sludge from the resulting clarified water prior to the addition of lime to the product generation clarified water in the final liming stage.

12. A process for treatment of pond water from phosphoric acid production comprising the steps of:
performing a first liming stage comprising the steps of:
increasing the pH of the pond water, such that the pond water forms a first liming stage precipitate and a first liming stage clarified water, wherein the first liming stage clarified water has a phosphorus and fluorine concentration of P1 and F1; and
separating the first liming stage precipitate from the aqueous solution to obtain a clarified water;
performing a product generation stage comprising the steps of:
mixing the first stage clarified water with lime to create a product generation stage precipitate and product generation clarified water, wherein lime is added in a quantity sufficient to raise the pH to the range of about 4.0 to about 7.0, and wherein the product generation clarified water has a phosphorus and fluorine concentration of P2 and F2, such that the concentration of P1 minus the concentration of P2 divided by the concentration of F1 minus the concentration of F2 is greater than 100;
separating the product generation stage precipitate from the product generation stage clarified water to obtain a solid product and a re-clarified liquid, wherein the solid product contains di-calcium phosphate values precipitated from the pond water; and
directing the re-clarified water for further treatment, use or disposal.

13. The process according to claim 12 further comprising the steps of:
adding lime to increase the pH of the product generation stage clarified water to form a final liming stage precipitate;
separating the final liming stage precipitate from the aqueous water, to form the solids from the final liming stage and the clarified treated water; and
directing the clarified treated water for further use or disposal.

14. The process according to claim 13 further comprising the step of adding an anionic or non-ionic flocculating agent at the product generation stage, prior to the final liming stage.

15. The process according to claim 13 wherein a quantity of lime is added to the product generation stage clarified water to form the final liming stage precipitate in a quantity sufficient to result in a pH of about 9.0 to about 12.0.

16. The process according to claim 12 wherein the pond water is generated from the wet process phosphoric acid production process.

17. The process according to claim 12 wherein the pH is increased in the first liming stage with a base selected from the group consisting of $CaCO_3$, $Ca(OH)_2$, CaO, NaOH, $NaHCO_3$, $Na_2CO_3$, KOH, $KHCO_3$, $K_2CO_3$, ammonia and ammonia salts.

18. The process according to claim 12 wherein the step of increasing the pH of the pond water in the first liming stage is performed by the addition of a base in a quantity sufficient to result in a pH of about 3.0 to about 5.0.

19. The process according to claim 12 wherein the lime is added in sufficient quantity to raise the pH of the product generation clarified water in the product generation stage to the range of about 4.5 to about 7.5.

20. The process according to claim 12 wherein the lime is added in sufficient quantity to raise the pH of the product generation clarified water in the product generation stage from about 5 to about 7.5.

21. The process according to claim 12 further comprising the step of processing the solid product from the product generation stage for greater than 100:1 phosphorus to fluoride ratio as an animal feed supplement or feedstock for technical grade phosphoric acid production.

22. The process according to claim 12 further comprising the step of adding an anionic or non-ionic flocculating agent prior to the step of separating the first precipitate from the aqueous water.

23. A process for treatment of pond water from phosphoric acid production comprising the steps of:
performing a first liming stage comprising the steps of:
increasing the pH of the pond water, such that the pond water forms a first liming stage precipitate and a first liming stage clarified water, wherein the first liming stage clarified water has a phosphorus and fluorine concentration of P1 and F1; and
separating the first liming stage precipitate from the aqueous solution to obtain a clarified water;
performing a product generation stage comprising the steps of:
mixing the clarified water with solids from a final liming stage to form a product generation stage precipitate and product generation clarified water, wherein the product generation aqueous solution has a phosphorus and fluorine concentration of P2 and F2, such that the concentration of P1 minus the concentration of P2 divided by the concentration of F1 minus the concentration of F2 is greater than 100;
separating the product generation stage precipitate from the aqueous solution to obtain a solid product and a re-clarified water, wherein the solid product contains di-calcium phosphate values precipitated from the pond water;
performing a silica separation stage comprising the steps of:
holding the re-clarified water portion from the product generation stage for a time period sufficient to allow silicic acid present in the clarified portion to decompose into a hydrated silicon dioxide sludge;
gently agitating the product generation clarified water to allow decomposition of silicic acid into resultant silicon dioxide;
separating the hydrated silicon dioxide sludge from the resulting clear water;

performing a final liming stage comprising the steps of:
  adding lime to increase the pH of the re-clarified water to form a final liming stage precipitate
  separating the final liming stage precipitate from the aqueous liquid water to form the solids from the final liming stage and the clarified treated water, wherein the solids from the final liming stage are the solids added in the product generation stage; and
  directing the clarified treated water for further treatment, use or disposal.

24. The process according to claim 23 further comprising the step of adding an anionic or non-ionic flocculating agent prior to the step of separating the first liming stage precipitate from the aqueous liquid.

25. The process according to claim 23 further comprising the step of adding a cat-ionic flocculating agent prior to the step of separating the hydrated silicon dioxide sludge from the water.

26. The process according to claim 23 further comprising the step of adding an anionic or non-ionic flocculating agent prior to the step of separating the final liming stage precipitate from the water.

27. The process according to claim 23 wherein a quantity of lime is added to the re-clarified water to form the final liming stage precipitate in a quantity sufficient to result in a pH of about 9.0 to about 12.0.

28. The process according to claim 23 wherein the pond water is generated from the wet process phosphoric acid production process.

29. The process according to claim 23 wherein the pH is increased in the first liming stage with a base selected from the group consisting of $CaCO_3$, $Ca(OH)_2$, $CaO$, $NaOH$, $NaHCO_3$, $Na_2CO_3$, $KOH$, $KHCO_3$, $K_2CO_3$, ammonia and ammonia salts.

30. The process according to claim 23 wherein the step of increasing the pH of the pond water in the first liming stage is performed by the addition of a base in a quantity sufficient to result in a pH of about 3.0 to about 5.0.

31. The process according to claim 23 wherein the solids from a final liming stage are added in sufficient quantity to raise the pH of the clarified water in the product generation stage to the range from about 4.0 to about 7.5.

32. The process according to claim 23 wherein the solids from the final liming stage are added in sufficient quantity to raise the pH of the clarified water in the product generation stage from about 5 to about 7.5.

33. The process according to claim 23 further comprising the step of processing the solid product from the product generation stage at greater than 100:1 phosphorus to fluoride ratio as an animal feed supplement or feedstock for technical grade phosphoric acid production.

34. The process according to claim 23, comprising the step of adding an anionic or non-ionic flocculating agent at the product generation stage, prior to holding the clarified water for hydrated silica formation.

35. The process according to claim 23, further comprising the step of adding an anionic or non-ionic flocculating agent prior to the step of separating the first precipitate from the aqueous liquid, whereby the flocculating agent enhances the sedimentation and precipitation of fluoride.

* * * * *